United States Patent [19]

White et al.

[11] Patent Number: 4,956,420

[45] Date of Patent: Sep. 11, 1990

[54] SELECTIVE CATALYTIC PROCESS FOR CONTROLLED MODIFICATION OF ETHYLENE-(ALPHA-OLEFIN)-DIENE MONOMER TERPOLYMER WITH HALOTHISULFONAMIDE

[75] Inventors: Donald A. White, Edison; Richard S. Auda; William M. Davis, both of Westfield; David T. Ferrughelli, Bridgewater, all of N.J.

[73] Assignee: Exxon Chemical Patents Inc., Linden, N.J.

[21] Appl. No.: 244,743

[22] Filed: Sep. 15, 1988

[51] Int. Cl.$^5$ ............................................. C08C 19/22
[52] U.S. Cl. .................................. 525/351; 525/331.8
[58] Field of Search ......................................... 525/351

[56] References Cited

U.S. PATENT DOCUMENTS

| | | | |
|---|---|---|---|
| 3,793,298 | 2/1974 | Sychbertus | 525/351 |
| 3,915,907 | 10/1975 | Hopper | 525/351 |
| 3,970,133 | 7/1976 | Hopper | 152/353 |
| 4,513,116 | 4/1985 | Kowalski et al. | 525/354 |
| 4,548,995 | 10/1985 | Kowalski et al. | 525/354 |
| 4,554,326 | 11/1985 | Kowalski et al. | 525/354 |
| 4,563,506 | 1/1986 | Kowalski et al. | 525/354 |
| 4,820,780 | 4/1989 | Hopper | 525/351 |

OTHER PUBLICATIONS

R. J. Hopper, "Improved Cocure of EPDM-Polydiene Blends by Conversion of EPDM Into Macromolecular Cure Retarder", *Rubber Chemistry and Technology*, vol. 49, p. 346 and Table 1.

G. A. Olah, *Friedel-Crafts Chemistry*, John Wiley & Sons, 1973, p. 238.

R. J. Hopper et al., Preprint, International Conference on Advances in the Stabilization and Controlled Degradation of Polymers, *Ozone Resistant, Co-Curable Blends of Chemically Modified EPDM with Polydiene Elastomers*, 5/84.

*Primary Examiner*—Christopher Henderson
*Attorney, Agent, or Firm*—H. L. Cohen; M. L. Gibbons

[57] ABSTRACT

Preparation of halothio-sulfonamide-modified terpolymers having a low degree of unsaturation is accomplished by preferably reacting N-chlorothio-sulfonamide with an ethylene-(alpha-olefin)-diene monomer terpolymer comprising, for example, 1,4- hexadiene and/or dicyclopentadiene, in the presence of a catalyst of the formula MAn, where A is an anion or mixture of anions of a weak acid, and M is a metal selected from copper, antimony, bismuth and tin and n is a number which corresponds to the oxidation state of M divided by the valence of said weak acid anion. The reaction is preferably carried out in a melt phase process. Additionally, metals such as zinc and iron can be used at low concentrations in a melt phase process or at short reaction times in a solution process. Mixtures of such modified terpolymers with highly unsaturated rubbery polymers and vulcanizates of such mixtures are particularly useful in pneumatic tire sidewalls.

35 Claims, 1 Drawing Sheet

Figure 1

SELECTIVE CATALYTIC PROCESS FOR CONTROLLED MODIFICATION OF ETHYLENE-(ALPHA-OLEFIN)-DIENE MONOMER TERPOLYMER WITH HALOTHISULFONAMIDE

BACKGROUND OF THE INVENTION

This invention relates to an improved process for preparing modified polymers having a low degree of unsaturation. Particularly it relates to a catalytic process for carrying out such reactions, more particularly to the use of a metal-containing catalyst, especially catalysts of specific metal salts of weak acids.

Modified polymers of the type of interest herein, specifically rubbery polymers, are described in U.S. Pat. No. 3,915,907 and U.S. Pat. 3,970,133 (R. J. Hopper) incorporated herein by reference. The desirability and advantages of such polymers was additionally disclosed in articles authored and co-authored by R. J. Hopper (Rubber Chemistry and Technology, Vol. 49, p. 341-352 (1976) and International Conference on Advances in the Stabilization and Controlled Degradation of Polymers, Lucerne, Switzerland, May 23-25, 1984), also incorporated herein by reference.

These references describe the reaction of various N-chlorothioamides, and particularly N-chlorothio-sulfonamides with various ethylene propylene diene monomer (EPDM) rubbers in solution (see, e.g., Examples I-XII of U.S. 3,915,907) as well as by mixing in a Banbury® type internal mixer (Examples XIII-XVI of U.S. 3,915,907). Furthermore, in Example XVII of the same reference, there is disclosed in a solution reaction the use of powdered anhydrous zinc chloride (this is referred to as a catalyst in Table I, footnote g and page 346 of the cited Rubber Chemistry and Technology article). The references contain no further disclosure concerning the effect of zinc chloride nor do they suggest the use of other catalytic agents. Prior to the invention herein, the melt phase graft reaction had not been achieved under commercially useful conditions (i.e., rate, conversion and product quality). It is the discovery of selective catalysts that has permitted this advance.

Mixtures or blends of low-unsaturation rubbery polymers, particularly EPDM, with highly unsaturated rubbery polymers are of practical importance because of the superior ozone resistance imparted to the blend by the low-unsaturation EPDM rubber. Unfortunately, the presence of the low-unsaturation rubber also affects the mechanical and hysteresis characteristics of the vulcanizates in an adverse manner, as evidenced by lower tensile strength and modulus values, and by higher dynamic heat build-up and permanent set. These undesirable responses are contributed to by the mutual incompatibility of the two types of rubber, the substantially slower cure rate of the low-unsaturation rubber, and the greater affinity of the typically polar curatives for the high-unsaturation rubber. As a result, the vulcanized blend is a heterogeneous dispersion of poorly cured and/or largely uncured low-unsaturation rubber in well cured high-unsaturation rubber. The resulting poorer mechanical and hysteresis properties severely limit, or preclude, the use of such blends in articles subjected to severe service requirements such as tires. A method for improving the physical and dynamic properties of such rubbery polymer vulcanized blends is of considerable commercial and practical importance.

SUMMARY OF THE INVENTION

An improved catalytic process for modifying a terpolymer comprising ethylene, at least (a) one additional (alpha-olefin), and at least one non-conjugated diene monomer, wherein said alpha-olefin contains 3 to 16 carbon atoms and wherein said non-conjugated diene is present at greater than about 0.1 weight percent based on the total weight of the terpolymer, with (b) N-halothiosulfonamide of the formula wherein the mole ratio of said N-halothio-sulfonamide to unsaturated sites in said terpolymer is in the range of about 0.06/1 to about 1/1, where $R^1$ to $R^2$ are selected from the group consisting of alkyl radicals having 1-20 carbon atoms, aralkyl radicals having 7-20 carbon atoms, and aryl and substituted aryl, e.g., haloaryl, radicals having 6-10 carbon atoms and where $R^1$ is also selected from radicals having the formula where $R^3$ and $R^4$ are individually selected from said alkyl, aralkyl, and aryl and substituted aryl, e.g., haloaryl, radicals and where $R^3$ and $R^4$ can be joined together to represent radicals selected from $+CH_2+_n$, where n is an integer of 4 to 7, and $+CH_2+_2-O+CH_2+_2$, where X is selected from chlorine and bromine, which comprises bringing (a) and (b) into reactive contact in the presence of catalyst of the formula $MA_n$, wherein A is an anion or mixture of anions of a weak acid, M is a metal selected from the group consisting of copper, antimony, bismuth and tin, and n is a number corresponding to the oxidation state of M divided by the valence of said weak acid anion. The use of particularly preferred catalysts and catalyst concentrations produces modified EPDM which is substantially gel free.

In a further preferred embodiment, the terpolymer is an ethylene-propylene-diene monomer (EPDM) terpolymer, and the modified terpolymer is particularly useful in mixtures with highly unsaturated rubbers as vulcanized components of tires, e.g., tire sidewalls.

DETAILED DESCRIPTION (A) Terpolymer. The term ethylene-(alphaolefin)-diene monomer terpolymer ("EPDM") as used herein with respect to the unmodified EPDM of this invention is meant to be inclusive of terpolymers, tetrapolymers, etc. Thus the EPDM will comprise ethylene, one or more alphaolefins, and one or more diene monomers, can be substantially amorphous, and can have a substantially random arrangement of at least the the ethylene and the alphaolefin monomers.

The EPDM, prior to modification with N-chlorothiosulfonamide (as described below) will generally have a weight average molecular weight (Mw) in the range between about 10,000 and 1,000,000 or higher, typically between about 15,000 and 500,000, and more typically between about 20,000 and 350,000.

Typically EPDM is "substantially amorphous," and when that term is used to define the EPDM it is to be taken to mean having a degree of crystallinity less than about 25%, preferably less than about 15%, and more preferably less than about 10% as measured by means known in the art. Three major methods of determining crystallity are based on specific volume, x-ray diffraction, and infrared spectroscopy. Another well-established method, based on measurement of heat content as a function of temperature through the fusion range, is now easily carried out using differential scanning calorimetric measurements. It is known that these independent techniques are in good experimental agreement. However, it should also be recognized that EPDM which contains higher levels of crystallinity, and therefore is other than substantially amorphous can also be modified by the invention disclosed herein.

EPDM useful in this invention will contain about 20 to about 90 weight percent ethylene, preferably about 30 to 85 weight percent ethylene, and even more preferably about 35 to about 80 weight percent ethylene.

Alpha-olefins suitable for use in the preparation of the EPDM are preferably $C_3$–$C_{16}$ alpha-olefins. Illustrative non-limiting examples of such alpha-olefins are propylene, 1-butene, 1-pentene, 1-hexene, 1-octene, and 1-dodecene. The alpha-olefin content of the EPDM prior to modification is generally about 10 to about 80 weight percent, preferably about 20 to about 70 weight percent. The preferred alpha-olefin for the purposes of this invention is propylene.

The diene monomers useful in this invention include those typically used in EPDM polymers prepared by Ziegler-Natta polymerization. Such diene monomers are selected from the polymerizable, non-conjugated dienes and can be straight chain, hydrocarbon di-olefins or cycloalkenyl-substituted alkenes, having about 6 to about 15 carbon atoms, for example: Straight chain acyclic dienes such as 1,4-hexadiene and 1,6-octadiene and multi-ring alicyclic fused and bridged ring dienes such as dicyclopentadiene as well as certain norbornene compounds which satisfy the requirement described hereinbelow, e.g., propenyl norbornene and crotyl norbornene; and mixtures thereof. Of these, the preferred dienes are 1,4-hexadiene and dicyclopentadiene, most particularly 1,4-hexadiene.

After incorporation in the polymer, the residual unsaturation contributed by the diene monomer should not result in an olefinic carbon atom which is fully substituted (a quarternary carbon atom) Therefore, dienes such as 5-ethylidene-2-norbornene and 5-methylene-2-norbornene are not preferred because one of the residual olefinic carbon atoms in the polymer is fully substituted.

The total diene monomer content in the EPDM is about 0.1 to about 15 weight percent, preferably 0.5 to about 12 weight percent, and most preferably about 1.0 to about 6.0 weight percent. In those instances where a combination of dienes is used, the preferred diene should comprise at least about 20 percent of the diene present in the polymer, preferably at least about 40 percent, most preferably at least about 60 percent, for example at least about 75 percent.

(B) N-halothio-sulfonamide. The term N-halothiosulfonamide includes reactants of the formula where X is chlorine or bromine, preferably chlorine (N-chlorothio-sulfonamide), hereinafter referred to as CTSA, where $R^1$ and $R^2$ are selected from the group consisting of alkyl radicals having 1–20 carbon atoms, aralkyl radicals having 7–20 carbon atoms, alkaryl radicals having from 7–20 carbon atoms, and aryl and substituted aryl, e.g., haloaryl, radicals having 6–10 carbon atoms and where $R^1$ is also selected from radicals having the formula where $R^3$ and $R^4$ are individually selected from said alkyl, aralkyl, and aryl and substituted aryl, e.g., haloaryl, radicals and where $R^3$ and $R^4$ can be joined together to represent radicals selected from $-(CH_2)-n$, where n is an integer of 4 to 7, and $-(CH_2)_2O-(CH_2)-$.

In the practice of this invention, for the N-chlorothiosulfonamide, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical.

Representative of radicals suitable for $R^1$ are radicals selected from methyl, tert butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, tert butyl, 1-eicosyl, cyclohexyl benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulfonamides which can be used in the present invention are
N-chlorothio-N-methyl-methanesulfonamide,
N-chlorothio-N-methyl-benzenesulfonamide,
N-chlorothio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfamide,
N-chlorothio-N-methyl-N',N'-(pentamethylene)sulfamide
N-chlorothio-N-methyl-N',N'-diethylsulfamide and
N-chlorothio-N-phenyl-benzenesulfonamide.

Chlorothiosulfonamides suitable for use in the admixture of the present invention, as well as their preparation, have further been described in the patent literature. For example, West German DPS No. 1,156,403 shows the preparation of chlorothio-sulfonamides by reaction of a sulfonamide with $SCl_2$ in the presence of an organic acid acceptor.

West German DPS No. 1,101,407 shows the preparation of chlorothiosulfonamides from N,N'-dithiobis(sulfonamides) and chlorine or sulfuryl chloride. The chlorothiosulfonamides of the present invention can be prepared by analogous procedures.

The preferred amount of CTSA added depends on the specific nature of the low unsaturated (EPDM) polymer, the specific nature of the highly unsaturated polymer or polymers to be used in a blend of the two types of polymers, the specific cure system and the characteristics desired for the final vulcanizate. The ratio, (moles CTSA)/(moles unsaturated sites in the polymer) can be from about 0.03/1 to about 1/1, but is preferably in the range of about 0.15/1 to about 0.8/1 and more preferably about 0.2/1 to about 0.7/1. It is disclosed in U.S. 3,915,907 that, "with some EPDM polymers, the use of high ratios can lead to polymer viscosity increases which make processing exceedingly difficult or even practically unmanageable. It is expected that, recognizing this, those having ordinary skill in the polymer compounding art will use a ratio which enhances characteristics of the final vulcanized blend without detrimentally increasing polymer viscosity beyond the point of ease of processability" (column 5, lines 57-65). As a result of the unique catalysts and process identified herein, it is now possible to produce CTSA modified EPDM (of the type defined herein) which are substantially gel free and therefore not subject to the detrimental increases in polymer viscosity which may have heretofor been encountered.

(C) Catalyst. As noted previously, the literature discloses $ZnCl_2$ as a catalyst for the reaction of CTSA and EPDM. (R. J. Hopper, Rubber Chemistry and Technology, Vol. 49, page 346 and Table I.) Furthermore, it has been reported that zinc chloride is used as a catalyst for various reactions, including haloalkylation reactions, alkylation of olefins with polyhalides and aralkylation of olefins with alpha-haloaralkanes. ("Friedel-Crafts Chemistry," G. A. Olah, John Wiley & Sons, 1973, p. 238; hereinafter referred to as "Olah"). This same reference goes on to state that zinc chloride is a "fairly selective and mild catalyst . . . in many reactions where halides or alcohols are required to react selectively with olefinic double bonds". In contrast, the inventors herein have observed that a catalytic agent such as zinc chloride promotes gelation or crosslinking in conjunction with the reaction of CTSA with EPDM, which was also suggested as a possibility by Hopper in the above-cited article (id. page 350). Additionally in this reaction, the catalyst is required to be selective, catalyzing the addition reaction but not polymer crosslinking. Since both CTSA addition and polymer crosslinking are Lewis acid catalyzed, it is not obvious that any catalyst would be selective. Surprisingly, several such selective catalysts have been found which moderate the reaction of the polymer with CTSA in a preferred manner so as to provide a useful product. The problem of gelation or crosslinking is particularly significant when the process of modifying the EPDM with CTSA is conducted in the melt or under conditions where the EPDM is in substantially neat form. Therefor, the acidic halide zinc chloride is not useful as a catalyst for the process herein. However, other zinc compounds, such as the zinc salts of weak acids which result in gel sensitive systems can be used herein subject to restrictions, as will be described. The comparative examples demonstrate that, for the purposes of the present invention, zinc chloride does not result in the modified EPDM of interest. Catalysts such as those based on copper, tin, antimony and bismuth can be used advantageously in either bulk phase or solution reactions.

For purposes of the invention herein, crosslinking or gelation in the modified polymer has been characterized by measurement of the Mooney viscosity before and after modification (the Mooney viscosity test is described in ASTM D-1646). A substantial increase in Mooney viscosity can render the product unprocessable. This is important in applications such as tires in which the product must be blended with highly unsaturated rubbery polymers, and extruded and molded. In other applications, the product Mooney viscosity may be less critical. However, in general, substantially gel-free products are more useful and hence more desirable. It has also been observed that an EPDM polymer which has been subjected to reaction with CTSA and in which undesirable crosslinking has occurred, typically undergoes a change in color, turning brown in contrast to its original white or light tan color. To be considered substantially gel free, it is intended that the modified polymer have a Mooney viscosity of less than about 130% of that of its original, unmodified polymer, preferably less than about 125%, more preferably less than about 120%, most preferably about 85% to about 115%, for example about 90% to about 110%. Such changes in Mooney viscosity (if they are to occur) can be conveniently observed in the laboratory using a grafting reaction conducted for about 3 minutes in the melt (e.g., in a Brabender ®) about 125° C., using catalyst concentrations of about 100 to about 500 parts per million (of metal) based on polymer. However, it should be appreciated by those skilled in the art that in those circumstances in which a polymer is subject to crosslinking, small changes in the extent of crosslinking can have a substantial affect on properties (e.g., Mooney viscosity). Therefore, it is preferred that determination of the acceptability of the catalyst be made under process conditions which emulate or duplicate actual production of the modified polymer, e.g., full scale reaction. The susceptibility of a polymer to crosslinking during reaction is exacerbated when such reaction is carried out in concentrated polymer solution or, in particular, when conducted in the melt. Therefore, under dilute solution reaction conditions (particularly at short reaction times), substantially gel free modification of EPDM with CTSA may be accomplished which may not be indicative of the response under melt phase reaction conditions (this is discussed further with regard to the use, for example, of zinc or iron salts of a weak acid as catalysts at relatively high concentration and for a relatively short reaction time).

The process of the present invention was rendered successful by the discovery of the metal-containing catalysts represented by the formula MAn, wherein M is a metal preferably selected from the group consisting of copper, antimony, bismuth and tin (additionally, zinc and iron can be used under defined conditions, discussed below); A is preferably an anion or mixture of anions of a weak acid and n is a number corresponding to the oxidation state of M divided by the valence of said weak acid anion. The Lewis acidity of a catalyst depends on the nature of the metal atom and the anions present. Overall Lewis acid acidity of the catalyst is reduced by the presence of anions of lower electronegativity, i.e., anions of weaker acids. This appears to at least partially reduce the reactivity of the less preferred metals and in consequence leads to higher selectivity. As an example, zinc carboxylates, such as zinc naphthenate, can be used under conditions where zinc halides, such as zinc chloride cannot, as illustrated in the Examples below. When the metal is less active toward the crosslinking reaction, anions derived from stronger acids can be tolerated. Other considerations in the choice of anions include the following: anions which are sterically hindered, such as naphthenates or 2-ethylhexanoates are preferred as are anions with substantial hydrocarbon chains, such as stearates. Without wishing to be bound by theory, the sterically hindered anions may be advantageous in that they are capable of hindering the close approach of two polymer molecules, which is necessary for crosslinking to occur. Furthermore, anions comprising substantial hydrocarbon chains are particularly preferred in bulk phase reactions because of their compatibility with or solubility in hydrocarbons, such as molten polymers.

Weak acids are commonly characterized by means of the reference "pKa." This term is a measure of the completeness of the dissociation of the acid, Ka being the equilibrium constant of the dissociation of the acid, and the value pKa being the negative of the logarithm (to the base 10); the weaker the acid, the larger its pKa value. It is commonly accepted that acetic acid is a weak acid, with a pKa value at (25° C.) of about 4.75. For the purposes of this invention weak acids are those whose pKa are greater than about 4.0. Weak acids useful in the present invention include $C_4$ to $C_{20}$ saturated mono- or poly-carboxylic acids; in particular, a carboxylic acid selected from the group consisting of caproic, caprylic, lauric, stearic, 2-ethyl hexanoic, neodecanoic and naphthenic. Furthermore, the higher molecular weight carboxylic acid compounds are soluble in the rubber phase and are therefore more readily available for reaction, particularly when the reaction is carried out in the melt. Metal salts of this type are not mentioned at all in the comprehensive text by Olah cited above.

In carrying out the process of this invention, the catalyst component is present in the reaction medium at a concentration of about 1,000 to about 5 parts per million (ppm) metal in the polymer; preferably about 100 to about 5; more preferably about 50 to about 5 ppm. The catalyst can be premixed with EPDM (particularly for a melt phase process) or CTSA (or both), or added as an independent stream to the reactor; a combination of additive methods can also be used.

The preferred catalysts are found to enhance the rate of the CTSA addition reaction, but do so to a lesser extent than the less preferred catalysts. Thus less preferred catalysts are more reactive but less selective and it is clear that to some extent reactivity and selectivity are inversely related. Less preferred catalysts are those based on metals which, although they are capable of effecting essentially quantitative conversion of CTSA, result in the formation of moderate gel in the polymer. This effect is particularly noticeable as the concentration of the catalyst is elevated and when used in a melt phase reaction. An example of such a catalyst metal is iron, and it is useful when present during reaction at concentrations of less than about 75 ppm based on the polymer, preferably at a concentration of about to about 50 ppm, more preferably about 5 to about 25 ppm.

Still less preferred, but useful, are catalysts based on metals which result in gel at still lower levels of metal concentration in the polymer when the reaction is conducted in the melt phase. Examples of such metals include zinc, particularly in the form of a salt of a weak acid, which acids have been defined hereinabove. The use of such a metal catalyst is useful at concentrations of less than about 50 ppm, preferably such a catalyst is used at about to about 40 ppm, more preferably about 1 to about 10 ppm. However, as discussed above, the use of iron and zinc as metal components of the catalyst can be accomplished in a dilute solution process with suitable control to limit reaction time; for example, it is preferred that the reaction under such conditions be less than about 1 hour at about 100° C. In view of the teachings herein in combination with principles of reaction kinetics, one skilled in the art can make appropriate time/temperature adjustments.

Clearly, mixtures of useful catalysts of the type defined herein are also useful for producing the desired product. In contrast, it is quite surprising that metals such as cobalt and nickel have been found to be inactive as catalysts for the CTSA reaction, whereas the metals adjacent in the periodic table, copper, iron and zinc, are active (as demonstrated in the examples).

(D) Process Features. Reaction of the CTSA with EPDM can be achieved using both solution and melt phase (or neat) processes. One method involves addition of the chlorothiosulfonamide to a solution of the polymer in an inert organic solvent such as heptane, hexane, cyclohexane, methyl cyclohexane, chloroform, benzene or toluene. As taught in U.S. 3,970,133 more polar solvents are preferred. The reference teaches that they increase the rate of formation of polymer bound adduct; for example, adduct formation occurs much more rapidly in chloroform as a solvent than in hexane. The reference states that a mixture of nonpolar solvent with a highly polar solvent may be used advantageously; for example, a mixture of 40 volumes of hexane and 1 volume of acetic acid can produce substantially faster adduct formation as compared to hexane alone. However, the rate of substantially gel free adduct formation can be markedly improved by catalysis with metal salts of weak acids such as copper, antimony, bismuth and tin; for example copper (II)naphthenate.

Another method comprises directly blending the CTSA with the polymer by mixing means such as an internal mixer (Banbury ®, Brabender ®) or extruder type) or an open roll mill. For direct mixing, it is advantageous to suspend or dissolve the CTSA in a relatively inert medium such as mineral oil or chlorinated paraffin in order to improve dispersion as well as minimize hydrolysis by atmospheric moisture. It is particularly important that the reaction be carried out using reactants (rubber, CTSA) and diluents, if any, which have been thoroughly and uniformly dried to avoid erratic reactivity and/or the formation of undesirable by-products due to hydrolysis of CTSA and the formation of $SO_2$, HCl and elemental sulfur. In the most preferred procedure all traces of moisture are removed. As a practical matter in view of large scale production and handling, it is preferred that polymer moisture be less than about 0.1 weight percent, more preferably less than about 0.05 weight percent, most preferably less than about 0.02 weight percent.

The reaction is preferably carried out at the lowest temperature commensurate with the extent of reaction desired and in view of reasonable reaction times as well as polymer processing/flow and polymer degradation, particularly when the reaction is conducted in the melt. Solution reaction can be carried out at from about 10° C. to about 125° C., preferably about 20° C. to about 80° C., with ambient temperature being convenient and practical. Reactions conducted in the melt phase are preferably carried out at about 40° C. to about 170° C.; more preferably about 50° C. to about 150° C.; most preferably about 60° C. to about 130° C.

Melt phase reactions are preferably carried out in equipment and in processes as taught in U.S. Pat. Nos. 4,513,116; 4,548,995; 4,554,326 and 4,563,506 incorporated herein by reference and adapted to the specific requirements of the reaction and reactants herein. These references describe reaction of polymers in a continuous flow device such as an extruder, for example, a twin screw extruder. In the present process a neat polymer, or one with a limited amount of diluent, is caused to react with the reagent, CTSA, to produce a useful product. For the purposes of this invention the terms melt phase and bulk phase are used interchangeably. Furthermore, it is to be understood that reference to the reaction of a neat polymer in the melt (or in a melt phase process) includes polymer with a limited amount of diluent. The use of a diluent is discussed below in conjunction with the feed zone of an extruder process for carrying out the invention. The polymer is a highly viscous material with a limited amount of unsaturation (reactive sites) and the CTSA is, under typical reaction conditions, a low viscosity fluid. Prior to the invention herein, the melt phase graft reaction had not been achieved under commercially useful conditions (i.e., rate, conversion and product quality). It is the discovery of selective catalysts that has permitted this advance.

The EPDM polymer and CTSA are preferably contacted, or reacted, in the presence of the defined catalyst in a continuous flow device. Suitable devices include kneaders, extruders (employing single or multiple screws, e.g., twin screws), continuous mixers and a blending/extrusion device referred to as a cavity transfer mixer (see, e.g., European Rubber Journal, July-August, 1982, pages 29–32 and G. M. Gale, U.K. patent application 8030586, 1980). Although the defined polymers can attain very high viscosities, even at relatively high temperatures, such devices are capable of sufficiently deforming such polymers to achieve the necessary degree of mixing and reaction.

The continuous flow device should be capable of initially forming the polymer feed into a cohesive mass and then deforming the polymer, disrupting the polymer surface, thereby exposing fresh, i.e., unreacted, polymer to the CTSA. The exposure of new surface does not necessarily require the use of high speeds where, e.g., an extruder is used. However, surface disrupting means are preferably employed, for example, pins, reverse flow sections, a "Maillefer" screw design, the cavities of a cavity transfer mixer, multiple flight screw section, interrupted flight sections, e.g., slotted flights, and combinations thereof. In this manner, efficient mixing and contact between the EPDM and CTSA are achieved at the lowest temperature consistent with achieving the desired extent of reaction. As a consequence, undesirable polymer degradation is avoided as are side reactions which may result in, e.g., crosslinking of the polymer.

CTSA is fed to the reaction zone, preferably by means of a separately controllable feed line. It is metered into the reaction zone so as to be present at the desired concentration, taking into consideration the polymer feed rate. Typically, feed rates (based on 100 kg per hour of polymer) of about 1 to 3 weight % are useful, preferably about 1.5 to about 2 weight %. Temperature is controlled in the range of about 25° C. to about 130° C. so that the CTSA is preferably in a liquid state to facilitate feed control and mixing. Particularly useful CTSA has a melting point of about 20–30° C. at ambient pressure, so that they can readily handled as a liquid at moderately elevated temperature.

The catalyst can be fed to the reaction zone by various convenient means: it can be predispersed at the desired concentration in the polymer or the CTSA or both; it can also be introduced as a separate feed stream into the feed zone and/or the reaction zone. Preferably, the catalyst is introduced by blending it with the polymer prior to introducing the CTSA into the continuous flow device.

When the region in which the polymer and CTSA are brought into contact, e.g., the reaction zone of an extruder, is not completely filled with polymer, the CTSA and the polymer are present as either discontinuous or continuous phases; a discontinuous polymer phase is preferred. A preferred operating mode of the process utilizes a reaction zone which is only partially filled with polymer; this permits reaction by-products to disengage from the polymer phase and facilitates contact between CTSA and newly generated polymer surface. Generally, the polymer is present so that it fills the available volume of the reaction zone to the extent of about 5 to about 95%, preferably 10 to about 75%, more preferably about 15 to about 50%, for example 20 to about 35% of the reaction zone.

One means of achieving a partially filled reaction zone is to feed, in a controlled manner, less polymer into the reaction zone than the conveying capacity of the zone. The space around the polymer is occupied in part by the CTSA and, as fresh surface is exposed to the CTSA reaction occurs. In a preferred embodiment, utilization of vent means at a downstream position in the reaction zone facilities removal of by-products. Another preferred embodiment imposes a vacuum on the vent means so as to more efficiently remove such materials. The vent means comprises one or more vents in the contacting region.

Downstream of the reaction zone, vent means are provided to remove unwanted and undesirable reaction by-products, including HCl and SO2, in the event any are formed by hydrolysis of CTSA due to, for example, the presence of moisture in the system. In a preferred embodiment, disengagement is achieved by injection of an inert gas, e.g., nitrogen, argon, carbon dioxide or dry air into said continuous flow device. The injection point or points for the inert gas may be downstream and/or upstream of the vent means. In another preferred embodiment, disengagement is made more efficient by imposing a vacuum on the vent means. The vent means may comprise one or more separate venting sections. In the case of multiple venting sections, it is preferable to provide appropriate screw elements between the vents to form a polymer seal between the individual venting sections.

Rapid and complete disengagement is effected by employing process features such as those described earlier with regard to reaction in order to achieve polymer deformation and surface disruption so as to expose fresh polymer surface to the inert gas. In a preferred embodiment, disengagement occurs in a region of the continuous flow device which is not completely filled with polymer. In a still more preferred embodiment, vent means are provided so that the inert gas and byproducts are removed from the polymer conveying means. The amount of inert gas employed can be readily determined and should be an amount effective for the disengagement without being unnecessarily wasteful; inert gas injection can be achieved using more than one injection port. Another option is a region for injecting a polymer stabilizer into the continuous flow device. In another embodiment, the inert gas injection and venting configuration is designed so as to permit explosive release of the injected inert gas from the reacted polymer in order to facilitate in the removal of unwanted materials. Filter means can also be employed to remove undispersed material from the modified polymer.

Preferably the various zones which have been described are separated from one another in such a manner as to permit maximum independent control of conditions in each zone. For example, a seal comprising polymer melt is formed between the feed reaction and reaction zone so as to avoid "blow back" of CTSA. A polymer melt seal may also be provided to allow separation between multiple vent zones. The means of achieving such a polymer melt seal are well known to those skilled in the art of polymer processing.

Details and conditions are described below for a preferred embodiment utilizing an extruder-reactor, but the principles disclosed are broadly applicable to the general process. It is to be understood that reference to the screw of an extruder is to include both single and multiple (e.g., twin) screw extruders, intermeshing and nonintermeshing as well as co- and counterrotating screws. The extruder-reactor may be thought of as carrying out the polymer modification in various operating zones:

(A) Feed Zone—in which polymer is introduced into the extruder-reactor in convenient form. This form includes, for example, particles from bales of rubber which have been comminuted, particles and/or pellets of rubber which may be in stable form as produced and crumb from the finishing line of a rubber manufacturing plant, each of which is preferably free of reactive contaminants, e.g., moisture and reactive hydrocarbons.

The feed zone is designed to form the polymer feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures and shearing forces are preferred. This can be achieved, e.g., by utilizing extruder screws with relatively deep flights and by keeping the length, as short as possible commensurate with desired production rates. For example, polymer can be introduced at about room temperature and exit from the feed zone at about 40 to 150° C.

A restrictive dam is used to separate the feed zone from the reaction zone which follows it so as to prevent back leakage of reactants. This dam is not restrictive enough, however, to cause excessive overheating of the polymer. A restrictive dam can be, for example, a reverse flighted screw section, a filled screw section (also referred to as a compounder), a shallow flighted screw section, an unflighted screw section, combinations thereof, or other means known in the art. An unflighted screw section is preferred, and it can have a larger diameter than the root diameter upstream of it, for example 5–25% larger, but not greater than the screw flight diameter. If a reverse flighted screw section is employed it can be single or multi-flighted, preferably multi-flighted.

In addition to the polymer which is introduced into the feed zone, an optional diluent may also be added. A diluent can function to reduce the viscosity of the polymer to a level commensurate with subsequent good mixing and reaction without the necessity for excessive heat generation and a risk of molecular weight breakdown and undesirable side reactions. The diluent may be volatile saturated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the rubber in the reaction zone. Examples of suitable materials include inert gases such as nitrogen and argon, as well as gases such as carbon dioxide and air.

A diluent different in kind from those described above, but also suitable may also be retained with or in the polymer, such as a hydrocarbon oil. Suitable oils include saturated aliphatic oil and rubber process oils that are essentially saturated; the oil should not react with the CTSA. Where such oils are utilized, the modified polymer would contain oil after recovery and drying and would commonly be referred to as "oil extended". Oil extended rubber is well known in the art and various grades of oil extended EPDM, styrene butadiene rubber, and polybutadiene made by other means are commercially available. Such products are particularly useful where it is desirable, for example, to extend the rubber with high levels of filler, e.g., carbon black or mineral filler, to obtain properties from high molecular weight polymer which might otherwise be difficult to process because of its inherently high viscosity, etc.

The total amount of diluent, including that which may be present in the feed should not be greater than about 50 wt. % based on the polymer, preferably less than about 15 wt. %, most preferably about 5 to about 10 wt. %.

As discussed hereinabove, catalyst can be blended with the polymer prior to the polymer being fed to the extruder and/or it can be added as a separate feed stream. If as a separate stream, it is preferred that the catalyst be dispersed or dissolved in a carrier diluent to facilitate flow control. Suitable diluents include mineral oil and hydrocarbon, diluents inert to the reaction, for example, halogenated hydrocarbons.

(B) Reaction Zone—can generally be described as the zone in which the CTSA is caused to react with the polymer to completely effect the grafting reaction while simultaneously minimizing undesired side reactions. Screw configuration in the reaction zone is important to mixing efficiency and achievement of the overall objectives of the process. The configuration should be such as to cause disruption and reorientation of the flow of polymer, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the polymer, effected, in part, by the use of an optional diluent and by control of the molecular weight of the polymer and the polymer temperature as it enters the reaction zone, also determines, to a large extent, deformability. Selection of the temperature level influences the reaction and, along with residence time in the reaction zone, the nature of the end product. For maximum economy and continuity of production the choice of materials of construction of the reaction zone is particularly important; this also influences the type and level of potential contaminants in the finished polymer and their influence on long-term storage stability of the polymer as well as chemical reactivity. This is discussed in further detail later in this disclosure.

Control is required in order to optimize residence time and avoid polymer degradation and gelation. This can be achieved by, for example, controlling the CTSA feed rate in comparison to the rubber feed rate, design of the reaction zone (length, screw features and configuration, injection means, temperature, etc.) and RPM so as to determine time of reaction and to control the relative rates of the desired reaction versus competing side reactions and gelation.

The CTSA can be gaseous, liquid or solid and may be added either in a pure state or diluted with a suitable inert fluid. In this improved process alternative reaction zone mixing techniques are feasible. Injecting CTSA at a point or points filled with polymer can be employed. Similarly the reaction is allowed to occur at the continuously renewing polymer surface generated by the configuration of the reaction zone and conveying means, e.g., the extruder screw and barrel, in a reaction zone partially filled with polymer. Configuration of the screw and chamber walls should not be so restrictive as to cause excessive pressure and excessive shear heating of the polymer. Pressure at the point of injection need not be very high where the reaction zone is only partially filled with polymer and preferably vented. In addition, injection can be into the space not occupied by the polymer. A moderately positive injection pressure is suitable; the pressure selected should maintain a positive flow into the reaction zone and prevent plugging of the line. The specific pressure chosen is a matter of operating convenience. Generally, pressure at the point of injection is about 15 to about 400 psig.

Also important for achieving efficient reaction of the polymer and CTSA is the incorporation in the reaction zone of means to produce the level of polymer mixing and surface disruption preferred for the practice of this invention. As described earlier, this can be achieved, for example, by utilizing reverse flights on the reaction zone portion of the extruder screw, pins, etc. Other means, useful in combination with equipment design features, include operation of the screw at a rotation rate (using, for example, a 2 inch diameter screw) of about 50 to about 600 RPM, preferably about 70 to about 400 RPM, most preferably about 90 to about 350 RPM.

Catalyst addition can also be accomplished in the reaction zone, although with more difficulty insofar as achieving satisfactory dispersion. In such circumstances, addition at a point near the feed zone is preferred in order to allow maximum opportunity for mixing. The discussion hereinabove relating to catalyst injection is also relevant at this point.

Overall, it is desirable, by control of polymer viscosity, chamber and screw design, screw RPM, and operating pressure, to prevent excessive temperatures in the reaction zone while maintaining a high level of mixing. It is desirable that a reaction temperature of less than about 170° C. be achieved, preferably about 40° C. to about 170° C., more preferably about 50° C. to about 150° C., most preferably about 60° C. to about 130° C.

(C) Sweep Zone—in which residual by-product $SO_2$ and HCl are swept out of the extruder to avoid corrosion of the equipment. Suitable means to effect removal of these materials is the injection of an inert gas into the extruder. This is effected by employing process features such as those just described with regard to the reaction zone in order to disrupt the polymer surface and continually expose new surface to the inert gas in the sweep zone. In a preferred embodiment vent means are provided in this zone to permit the inert gas and disengaged materials to be swept out and immediately removed from the system. In a particularly preferred embodiment, the screw configuration in the region of the vent comprises a deep, single flighted screw with little or no mixing occurring in the vicinity of the vent in order to avoid restricting the exiting flow of inert gas and disengaged materials. In another preferred embodiment various additives and/or stabilizers are added to the polymer in the sweep zone. As discussed earlier, multiple injection sites can be used as well as a supplementary injection zone. In another embodiment, pressure in the system is controlled in order to explosively remove the unwanted products by maintaining pressure in the system up to the region of the vent where it is allowed to be rapidly reduced to ambient.

The sweep zone is designed so that the inert gas contacts the reaction products from the reaction zone as soon as possible after the grafting reaction. This is achieved when, e.g., a dam is used between the reaction and sweep zones, by having it as short as possible consistent with its functioning as a restrictive dam. The nature and configuration of various alternatives for the restrictive dam are described above for the dam between the feed and reaction zones. The injection port for the inert gas can be located as close as possible to the downstream end of the dam or the sweep gas can be injected so as to flow countercurrent to the flow of the grafted product mixture. Additionally, the sweep gas can first be injected into the reaction zone, downstream of CTSA introduction to effect the initial removal of by-products using the methods just described.

Polymer stabilizing agents can optionally be added in this zone. This can be done by incorporating the stabilizers at an injection point. Suitable stabilizers include those known in the art for stabilizing halogenated polymers.

(D) Exit Zone—preferably the extruder-reactor comprises a final exit zone (D) in which the temperature of the modified polymer product is adjusted for delivery therefrom at a temperature below about 170° C., more preferably below about 150° C. and most preferably below about 130° C., as a contribution to the stability of the polymer. Also in the exit zone, stabilizer(s) may initially be added to the swept polymer product if not added in the sweep zone, or additional stabilizer(s) can be added.

In addition to the extruder-reactor features just described, the process of this invention can also incorporate a system for recycling any organic diluent that may be added to the feed zone and/or included with the CTSA and, optionally, means for back-mixing the modified polymer to assure that the final packaged polymer is a homogeneous product.

Materials of construction in the feed zone, reaction zone and sweep zone are selected from those well known in the art to prevent or minimize reaction of the with CTSA, $SO_2$ and HCl, in view of safety equipment considerations as well as long equipment life.

The modified polymers of this invention can be processed in standard equipment used for each such polymers, such as internal mixers (e.g., Banbury ®), mills, extruders, calenders, etc. Said polymers are amenable to conventional compounding practice and various fillers and extenders can be incorporated, e.g., various carbon blacks, clays, silicas, carbonates, oils, resins, waxes, etc. The modified rubber of this invention may be cured or vulcanized by any of the prior art methods suitable for EPDM rubbers, e.g., using sulfur, sulfur-containing curing agents (such as sulfenamide derivatives, benzothiazyl disulfide, tetramethylthiouram disulfide, alkyl phenol disulfide, etc.), and mixtures thereof. Further details can be found in the R. J. Hopper references described hereinabove. Curing is usually accomplished at a temperature of from about 140° C. to about 250° C., preferably 150° C. to about 200° C., and usually takes from 1 to 150 minutes. The modified rubber is particularly useful in blends with high unsaturation rubbers, e.g., SBR, polyisoprene, polybutadiene, etc., as well as lower functionality rubbers such as bromobutyl and chlorobutyl, and is particularly useful in tire applications, e.g., tire sidewalls (see e.g., U.S. 3,970,133).

The practice of this invention is further illustrated by reference to the following examples which are intended to be representative rather than restrictive of the scope of the invention. Unless otherwise indicated, all parts and percentages are by weight.

In the following examples, the CTSA is N-chlorothio-N-methylbenzenesulfonamide. The polymers used have the following characteristics (the dienes are HD=1,4-hexadiene, DCP=dicyclopentadiene):

| Polymer | Ethylene (wt %) | Diene | Diene (wt %) | Mooney Viscosity ML, 1 + 4, 100° C. |
|---|---|---|---|---|
| A | 70 | HD | 3.5 | 69 |
| B | 53 | HD | 3.5 | 86 |
| C | 68 | DCP | 6.5 | 54 |

Polymers A and B were commercially available grades designated as Nordel ® 2744, 1470 (each manufactured by DuPont); polymer C was Royalene ® 301T (manufactured by Uniroyal). Polymer A also contains a low concentration of norbornadiene which results in no residual unsaturation in the polymer.

Prior to use, the polymers were tested to determine moisture content and, where necessary, dried by conventional means, such as mixing in a heated Banbury mixer, so that moisture contents were 200 ppm or less.

Examples 1 to 13 were carried out with solutions of the terpolymer using glass equipment.

COMPARATIVE EXAMPLE 1 AND EXAMPLES 2 TO 5

Comparative Example 1

Figure 1:
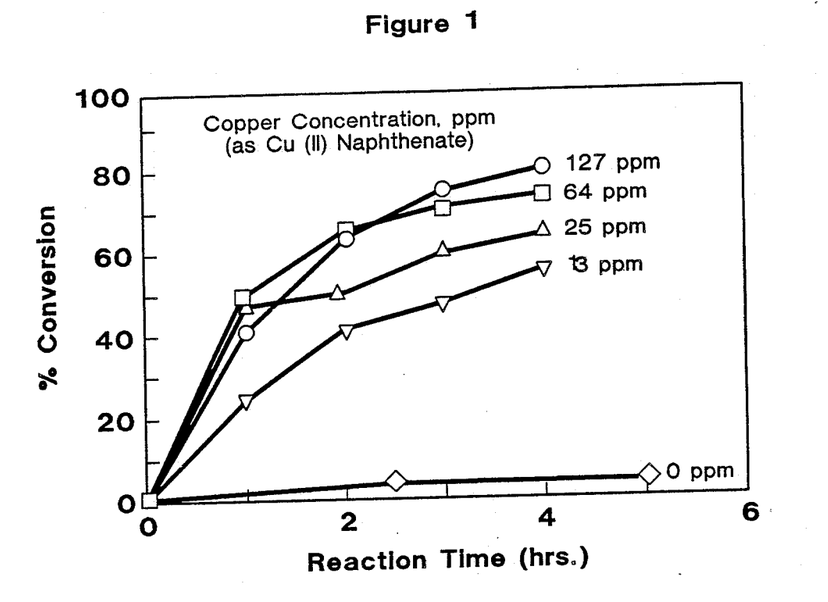
FIG. 1 is a graph illustrating the effect of concentration of one catalyst embodiment on the conversion of CTSA as a function of reaction time in solution.

The CTSA (89% purity; 0.50 g) was added to a refluxing solution of polymer A (15 g) in refluxing heptane (300 g) blanketed with dry nitrogen. Periodically a 25 ml portion of the reaction mixture was removed, cooled and treated with acetone to precipitate the modified terpolymer. The amount of CTSA chemically bound to the polymer and hence the conversion of the CTSA was determined by infrared spectroscopy. Results are shown in FIG. 1.

EXAMPLES 2 to 5

These examples were performed in the manner of Example 1 except that in each example, the following amounts in grams of copper(II) naphthenate was added as a solution in mineral spirits (8 weight % copper metal based on copper naphthenate): 0.50, 0.25, 0.10, 0.05. In each case the copper naphthenate was added to the refluxing solution prior to the addition of CTSA. The calculated copper contents of the reaction mixtures are 127, 64, 25 and 13 ppm metal. The results (FIG. 1) show the rate enhancement afforded by the copper catalyst and that, above 25 ppm Cu, the reaction rate is independent of catalyst concentration. All of the precipitated modified polymer product samples were white.

EXAMPLE 6

This example was performed in the manner of Example 2 except that zinc naphthenate as a solution in mineral spirits replaced the copper salt (10 weight % Zn metal based on zinc naphthenate; 0.50 g of solution added). The calculated zinc content of the reaction mixture is 158 ppm. A quantitative conversion of the CTSA was found after 1 hour. In contrast to Example 2, the product samples were brown, and there was difficulty molding a uniform film for testing by infrared spectroscopy; these features are indicative of gelation or crosslinking. Subsequent tests with larger quantities also showed a substantial increase in Mooney viscosity of the modified polymer in comparison to the starting polymer, also indicative of crosslinking or gelation.

EXAMPLE 7

This example was performed in the manner of Example 2 except that zinc stearate (0.50 g) replaced the copper salt. A quantitative conversion of the CTSA was found after 1 hour. Product samples were brown.

EXAMPLE 8

This example was performed in the manner of Example 2 except that ferric 2-ethylhexanoate as a 52% solution in mineral spirits (6 weight % Fe; 0.50 g) replaced the copper salt. A quantitative conversion of the CTSA was found after 1 hour. Product samples were brown.

EXAMPLES 9 TO 11

These examples were carried out in the manner of Example 6, except that the scale of the reactions was larger in order to provide sufficient product for measurement of Mooney viscosity. The reaction mixtures consisted of polymer A (45 g), CTSA (1.5 g), zinc naphthenate (1.5 g) and heptane (1000 ml). The reactions were performed under reflux conditions (100° C.) for 1, 3 and 5 hours respectively. After precipitation of the product and air drying, the results shown in Table 1 were obtained. The data indicate rapid reaction of the CTSA with the polymer, followed by a loss of CTSA from the polymer and simultaneous product crosslinking. As discussed in the specification, dilute solution conditions, particularly at shorter reaction times, are less likely to subject the polymer to crosslinking and therefore less indicative of response of the system under melt phase conditions. In addition, since there is a distribution of residence times in a bulk phase continuous process, the evidence in solution of undesirable reactions such as crosslinking at longer reaction times is a disadvantage.

EXAMPLE 12

This example was intended as a duplicate of Example 10. However it was clear that, within the first hour of reaction, product crosslinking had occurred, as was evidenced by precipitation of polymer from the solution. This was confirmed after a reaction time of 3 hours, and coagulation and analysis of the polymer, as indicated in Table 1. This example indicates that where the modified polymer is susceptible of crosslinking/gelation induced by the catalyst, the loss of reacted CTSA from the polymer and simultaneous crosslinking is subject to variability.

EXAMPLE 13

This example was carried out in the manner of Example 11 (in order to produce a larger amount of modified polymer), except that copper naphthenate was substituted for zinc naphthenate. As the results in Table 1 show, the reaction took place without significant loss of reacted CTSA and simultaneous crosslinking. The reaction time was 5 hours; it is estimated that in a molten polymer reaction the equivalent residence time would be less than about one minute. Allowing for additional time needed for mixing in the bulk phase, this is a preferred catalyst for a bulk phase process such as an extruder, in which a residence time of 1 to 2 minutes is encountered. In contrast, the results of Examples 9 to 12 indicate that zinc naphthenate catalyzed systems are susceptible of crosslinking in a bulk phase process.

TABLE 1

| Example | Catalyst[a] | Reaction Time Hours | Mooney Viscosity ML, 1 + 4, 100° C. | CTSA in Polymer mmol/g |
|---|---|---|---|---|
| 9 | Zn | 1 | 83 | 0.118 |
| 10 | Zn | 3 | 93 | 0.103 |
| 11 | Zn | 5 | 135 | 0.082 |
| 12 | Zn | 3 | 136 | 0.088 |
| 13 | Cu | 5 | 81 | 0.111 |

[a] as naphthenate

COMPARATIVE EXAMPLE 14 AND EXAMPLES 14 TO 19

Comparative Example 14

As stated hereinabove, zinc chloride has been identified in the literature as a catalyst for the reaction of CTSA and EPDM; this comparative example was conducted to quantify its effect. Anhydrous zinc chloride (120 mg) was dispersed in polymer A (135 g) by mixing on a rubber mill. Reactions (a) to (c) were performed using mixtures of the mill mix and untreated polymer A in order to vary the concentrations of zinc by a factor of 100.

| Reaction | Mill Mix (g) | Polymer A (g) | CTSA (g) | Zinc (ppm) | Product Mooney |
|---|---|---|---|---|---|
| (a) | 45.0 | 0.0 | 1.5 | 427 | NM |
| (b) | 4.5 | 40.5 | 1.5 | 43 | 144 |
| (c) | 0.45 | 44.55 | 1.5 | 4 | 97 |

-continued

| Reaction | Mill Mix (g) | Polymer A (g) | CTSA (g) | Zinc (ppm) | Product Mooney |
|---|---|---|---|---|---|
| (d) | 45.0 | 0.0 | 0.0 | 427 | 69 |

The mixture of polymers was brought to about 100° C. in a 50 ml Brabender ® internal mixer; the CTSA was added and mixing continued for 3 minutes, keeping the polymer temperature below 125° C. In the case of reaction (a), the product was too crosslinked to flow and it was not possible to measure either Mooney viscosity, as indicated by "NM" in the Table, or the conversion of CTSA by infrared. In reactions (b) and (c), quantitative conversions of CTSA were observed, but with substantial crosslinking as shown by the Mooney viscosity results in the Table. Even at the lowest level tested, zinc chloride gives unacceptable results.

In reaction (d) the CTSA was omitted and as the results show, no crosslinking occurred. This indicates that the crosslinking observed in reactions (a) to (c) is a result of the CTSA reaction in the presence of this catalyst and is not due to direct crosslinking of the polymer by zinc chloride during the heated mixing process.

Additionally, these results indicate that zinc chloride is not a selective catalyst, in that both the desired CTSA addition to the double bond and crosslinking are catalyzed. Selectivity requires the use of the specifically identified weaker Lewis acid catalysts. This is achieved by substitution of the anions of weaker acids for the halide anions (e.g., zinc naphthenate), and preferably by use of a metal atom of weaker Lewis acidity in combination with anions of weaker acids (e.g., copper naphthenate).

EXAMPLES 14 TO 19

These examples were carried out in a 50 ml internal mixer (Brabender ®) and served as a screening method to evaluate potential catalysts for use in larger scale continuous extruder experiments. Each example consisted of three reactions, differing in the amount of catalyst used: 200 mg (A), 20 mg (B) and 2 mg (C). The reaction mixture consisted of polymer A (45 g) and CTSA (1.5 g). The polymer was brought to about 100° C. in the mixer; the CTSA was added, followed by the catalyst, which was washed in with heptane (2 ml). Mixing was continued for 3 minutes adjusting rotor speed, if necessary, to keep the temperature at 125° C. or below.

In all cases, infrared spectroscopy of the products showed a quantitative (97 to 104%) conversion of the CTSA. However there was a substantial difference in the Mooney viscosity versus catalyst concentration profile for the various catalysts, as reported in Table 2. For copper naphthenate, the product Mooney viscosity was essentially independent of the catalyst concentration and not significantly changed from that of the feed polymer. For zinc naphthenate, crosslinking was observed at high concentration (Example 14A). Ferric 2-ethylhexanoate gave a response similar to zinc naphthenate, while antimony 2-ethylhexanoate responded like copper naphthenate. The bismuth and tin compounds showed intermediate behavior.

At the lowest concentration, zinc shows some evidence of gelation (Mooney increase), whereas the other metals gave acceptable results at the lowest concentrations. Because of such factors as feed rate fluctuations and incomplete mixing in a continuous bulk phase process, a catalyst exhibiting a flat profile (e.g., the copper or antimony compounds) is most preferred and catalysts based on zinc and iron are susceptible of crosslinking and therefore are useful under restricted conditions, e.g., concentration. Tin and bismuth containing catalysts are also useful with appropriate controls, as illustrated.

TABLE 2

| Example | 14 | 15 | 16 | 17 | 18 | 19 |
|---|---|---|---|---|---|---|
| Catalyst | Zn | Fe | Bi | Sn | Sb | Cu |
| Metal Content of Reaction Mixture (ppm) | | | | | | |
| A | 430 | 258 | 1032 | 860 | 774 | 344 |
| B | 43 | 26 | 103 | 86 | 77 | 34 |
| C | 4 | 3 | 10 | 9 | 8 | 3 |
| Product Mooney Viscosity, (ML, 1 + 4, 100° C.) | | | | | | |
| A | 146 | 162 | 86 | 81 | 63 | 63 |
| B | 81 | 68 | 74 | 69 | 71 | 68 |
| C | 74 | 66 | 66 | 65 | 68 | 70 |

(a) Metals were present in the following form:
Zn: zinc naphthenate (10% zinc).
Fe: ferric 2-ethylhexanoate (6% iron).
Bi: bismuth 2-ethylhexanoate (about 24% bismuth).
Sn: tin neodecanoate (20% tin).
Sb: antimony 2-ethylhexanoate (18% antimony).
Cu: copper naphthenate (8% copper).

EXAMPLES 20 TO 22

Examples 20 to 22 were carried out in a twin screw counter-rotating non-intermeshing extruder with overall L/D =54. The feed zone was located from L/D=1 to L/D=5. A compounder located at about L/D=6 produced a dynamic polymer seal to separate the feed zone from the reaction zone. The reaction zone extended from L/D=7 to L/D=36. CTSA at 30° C. was injected as a liquid into a deep single flighted screw section near L/D=7. The bulk of the reaction zone screw consisted of forward double and slotted forward triple screw elements to provide mixing, back-mixing and temperature generation, to facilitate reaction of CTSA with the EPDM. Nitrogen was injected at about L/D=10 to sweep unwanted products such as HCl and $SO_2$ out of the polymer. A first vented sweep zone was located between L/D=37 and L/D=41 and separated from a second vented sweep zone located between L/D=43 and L/D=47 by a compounder similar to that at L/D=6. A sweep zone from L/D=48 to L/D=51 was followed by a pressure building zone from L/D=52 to L/D=54. Nitrogen was injected at about L/D=52 to facilitate the sweeping out of residual unwanted HCl and $SO_2$ from the modified polymer by flow countercurrent to the polymer flow. Polymer temperature exiting the reaction zone was about 140° C.

COMPARATIVE EXAMPLE 20

Polymer A, dried to a moisture content of less than about 200 ppm, was fed at 40 kg/h and the CTSA (89% purity) at 1.0 kg/h (0.091 mmole/g of total feeds). A product sample, analyzed by infrared spectroscopy, showed the conversion of free CTSA to bound CTSA to be 82%. Consistent with the presence of free CTSA, the product evolved HCl and $SO_2$ vapors. As formed, the product was cream colored and had a Mooney viscosity (ML, 1+4, 100° C.) of 73 compared to 69 for the feed polymer.

EXAMPLE 21

This example was carried in the manner of Example 20, except that in the polymer feed there had been blended 0.04 wt. % zinc naphthenate (10% Zn; about 40 ppm Zn in polymer). Two product samples were analyzed by infrared spectroscopy. Conversions found were 95 and 100% and within experimental error, these are quantitative. Consistent with this result the product did not evolve acidic vapors. Mooney viscosities (ML, 1+4, 100° C.) were 100 and 115, compared to 69 for the feed polymer. Thus, although the zinc catalyst allows complete conversion in a melt phase extrusion reaction process, it also caused crosslinking of the polymer at the temperature, residence time and concentration used in this example.

EXAMPLE 22

This example was carried out in the manner of Example 20, except that in the polymer feed there had been blended 0.05 wt. % copper(II) naphthenate (8% Cu; about 40 ppm Cu in polymer). Two product samples were analyzed. Copper contents based on analysis of the samples were 55 and 48 ppm. Conversions found were 96 and 97% and within experimental error, these are quantitative. Consistent with this result the product did not evolve acidic vapors. Mooney viscosities were 82 and 80, a moderate increase compared with the starting polymer. The modified polymer was relatively stable as indicated by a minor increase in Mooney viscosity after storage for several days at moderately elevated temperature. Thus the copper catalyst allows complete conversion in a melt phase extruder process and produces a modified polymer without unacceptable crosslinking and with acceptable stability.

The modified polymer of this Example, having a Mooney viscosity of 80, was evaluated for vulcanization performance and compared to the unmodified feed polymer. The following formulation was used for evaluation purposes:

EPDM polymer (modified or unmodified)—149 g, synthetic polyisoprene (Natsyn ® 2200)—60 g, carbon black (ASTM grade, N-550)—100 g. The ingredients were mixed in a Banbury mixer for 4 minutes with rotor speed adjusted so that the composition temperature did not exceed 125° C. The ratio of EPDM composition to natural rubber (approx. 70:30) corresponds to that suggested by Hopper (Rubber Chem. Technol., Id, p.348) as particularly useful for distinguishing performance.

A portion of each of the mixed compositions (154.5 g) was blended with stabilizers and curatives on a rubber mill, adjusting speed and mill roll separation such that the composition temperature did not exceed 105° C. The stabilizers and curatives used were: butylated octylphenol (Wingstay ®T) 1.0 g, zinc oxide—4.0 g, sulfur—1.5 g, 2-(4-morpholinodithio)benzothiazole (Morfax ®)—1.0 and tetramethylthiuram disulfide—0.05 g.

A sample of each composition was tested using a Monsanto oscillating disc cure rheometer using the following settings: 1 degree arc, 60 min. rotor speed, 100 range, 100 cycles, standard size die and 150° C. temperature. Test results were as follows:

| Sample | Unmodified Polymer A | Modified Polymer A |
|---|---|---|
| Max. Torque (dnM) | 25.2 | 53.8 |
| Min. Torque (dnM) | 8.5 | 14.8 |
| 90% Max. Torque (dnM) | 22.7 | 48.4 |
| T90 (min) | 11.7 | 10.0 |
| T5 (min) | 6.7 | 3.8 |

T90 indicates the time required to reach 90% of the maximum torque and T5 the time required for the torque to increase 5 units above the minimum torque.

The large increase in maximum torque for the modified polymer versus the unmodified polymer is indicative of improved performance and suggests cocuring of the modified polymer with the high diene content rubber (Natsyn 2200). Such improved performance makes the modified polymer particularly useful where blends with highly unsaturated rubbers are used, for example, tires and tire sidewalls.

EXAMPLE 23

Polymer B (45 g) was dissolved in nitrogen blanketed, refluxing heptane (1000 ml) and to this solution was added zinc naphthenate (0.15 g) followed by CTSA (1.5 g). Reflux was continued and periodically 25 ml samples were removed and treated with acetone to precipitate the modified polymer. The amount of CTSA chemically bound to the polymer was found by infrared spectroscopy to be 0.084, 0.092, 0.085, 0.083 and 0.081 mmole/g after 1, 2, 3, 4 and 5 hours respectively. The rise in chemically bound CTSA followed by a decrease is attributed to reaction followed by loss of CTSA and crosslinking as observed in similar experiments with polymer A. After 5 hours the reaction was stopped and the remaining modified polymer was precipitated. It proved extensively crosslinked and a cohesive sample could not be formed for measurement of Mooney viscosity (indicative of a value in excess of 160).

EXAMPLE 24

This example was performed in the manner of Example 23 except that after 1 hour of reflux the reaction was stopped and the modified polymer recovered. It contained 0.089 mmole/g of chemically bound CTSA and had a Mooney viscosity of 99 (ML, 1+4, 100° C.).

EXAMPLE 25

This example was similar to Example 23, except that bismuth 2-ethylhexanoate (1.5 g) replaced the zinc compound. Bound sulfonamide was 0.073, 0.070, 0.068, 0.068 and 0.066 mmole/g after 1, 2, 3, 4 and 5 hours respectively. The precipitated polymer after 5 hours had a Mooney viscosity of 96 (ML, 1+4, 100° C.).

EXAMPLE 26

A heptane solution was prepared using polymer B (45 g) in 1000 ml of refluxing heptane. The CTSA (1.5 g) and copper naphthenate (1.5 g) were added and reaction continued for 5 hours. The modified polymer contained 0.115 mmole/g of chemically bound CTSA and had a Mooney viscosity of 96 (ML, 1+4, 100° C.).

EXAMPLE 27

A heptane solution was prepared using polymer C (45 g) in 1000 ml of refluxing heptane. The CTSA (1.5 g) and copper naphthenate (1.5 g) were added and reaction continued for 4 hours. The modified polymer contained 0.040 mmole/g of chemically bound CTSA and had a Mooney viscosity of 55 (ML, 1+4, 100° C.).

EXAMPLE 28

A heptane solution was prepared using polymer C (45 g) in 1000 ml of refluxing heptane. The CTSA (1.5 g) and ferric naphthenate (1.5 g) were added and reaction continued for 4 hours. The modified polymer contained 0.056 mmole/g of chemically bound CTSA and had a Mooney viscosity of 86 (ML, 1+4, 100° C.).

What is claimed is:

1. A process for modifying
   (a) a terpolymer comprising ethylene, at least one additional alpha-olefin, and at least one non-conjugated diene monomer, wherein said alpha-olefin contains 3 to 16 carbon atoms and wherein said non-conjugated diene is present at greater than about 0.2 weight percent based on the total weight of the terpolymer, and wherein said non-conjugated diene, following incorporation in said terpolymer, does not include an olefinic carbon atoms which is fully substituted, with
   (b) N-halothiosulfonamide of the formula wherein the mole ratio of said N-halothiosulfonamide to unsaturated sites in said terpolymer is in the range of about 0.03/1 to about 1/1, where $R^1$ and $R^2$ are selected from the group consisting of alkyl radicals having 1–20 carbon atoms, aralkyl radicals having 7–20 carbon atoms, aryl and haloaryl radicals having 6–10 carbon atoms and where $R^1$ is also selected from radicals having the formula wherein $R^3$ and $R^4$ are individually selected from alkyl aralkyl, aryl and haloaryl radicals and where $R^3$ and $R^4$ can be joined together to represent radicals selected from —$(CH_2)_n$— where n is an integer of 4 to 7, and —$(CH_2)_2$—O—$(CH_2)_2$— where X is selected from chlorine and bromine, which comprises bringing (a) and (b) into reactive contact at a temperature ranging from about 40° C. to about 170° C. in the presence of a catalyst of the formula MAn, wherein A is an anion or mixture of anions of a weak acid, M is a metal selected from the group consisting of copper, antimony, bismuth and tin, and n is a number corresponding to the oxidation state of M divided by the valence of said weak acid anion.

2. The process of claim 1 wherein said terpolymer comprises about 10 to about 80 weight percent alpha-olefin and about 0.1 to about 15 weight percent non-conjugated diene in polymerized form selected from the group consisting of 1,4-hexadiene and dicyclopentadiene.

3. The process of claim 2 where, in the N-halothiosulfonamide, $R^1$ and $R^2$ are selected from alkyl radicals having 1 to 6 carbon atoms, phenyl radicals, monoalkyl substituted phenyl radicals having from 7 to 10 carbon atoms and dialkyl substituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical, and where X is chlorine.

4. The process of claim 2 where, in the N-halothiosulfonamide, the $R_1$ radicals are selected from methyl, tert butyl, cyclohexyl, 2-eicosyl, benzyl 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl) phenyl radicals and the $R^2$ radicals are selected from methyl, tert butyl, 1-eicosyl, cyclohexyl, benzyl, 1-(p-n-dodecylphenyl)-1-ethyl, phenyl, 1-naphthyl, m-tolyl, 3,4-di(n-heptyl)phenyl, p-bromophenyl and 3-chloro-4-(n-butyl)phenyl radicals, and where X is chlorine.

5. The process of claim 2 wherein said N-halothiosulfonamide is selected from N-chlorothio-N-methyl-methanesulfonamide, N-chlorothio-N-methyl-benzenesulfonamide, N-chlorothio-N-methyl-p-toulenesulfonamide, N-chlorothio-N-ethyl-p-toluenesulfonamide, N-chlorothio-N-methyl-ethanesulfonamide, N-chlorothio-N-phenyl-p-toluenesulfonamide, N-chlorothio-N-(2-propyl)-methanesulfonamide, N-chlorothio-N-(1-propyl)-p-chloro-benzenesulfonamide, N-chlorothio-N-phenyl-methane-sulfonamide, N-chlorothio-N,N',N'-trimethylsulfamide, N-chlorothio-N-methyl-N',N'-(pentamethylene)sulfamide, N- chlorothio-N-methyl-N',N'-diethylsulfamide and N-chlorothio-N-phenyl-benzenesulfonamide.

6. The process of claim 2 where said terpolymer is comprised of ethylene, propylene and a non-conjugated diene selected from 1,4-hexadiene and dicyclopentadiene and where, in said N-halothio-sulfonamide, $R^1$ is selected from methyl, phenyl and p-tolyl radicals and $R^2$ is selected from methyl and phenyl radicals and X is chlorine.

7. The process of claim 1 wherein said weak acid anion is derived from the group consisting of $C_4$ to $C_{20}$ mono- or poly-carboxylic acids.

8. The process of claim 7 wherein said carboxylic acid anion is derived from the group consisting of caproic, caprylic, lauric, stearic, 2-ethyl hexanoic neodecanoic and naphthenic.

9. The process of claim 1 wherein said reactive contact is selected from solution reaction and melt reaction.

10. The process of claim 9 wherein said solution comprises an inert organic solvent selected from the group consisting of heptane, hexane, cyclohexane, methyl cyclohexane, chloroform, benzene, toluene and mixtures thereof.

11. The process of claim 9 wherein said melt reaction is accomplished by means selected from the group consisting of kneaders, mills, continuous flow means and internal mixers.

12. The process of claim 11, wherein said continuous flow means comprises means for conveying said terpolymer therethrough, means for delivering said N-halothio-sulfonamide and said catalyst, and polymer deforming and surface disrupting means.

13. The process of claim 12 wherein said continuous flow means is an extruder.

14. The process of claim 12 wherein said catalyst is:
(a) incorporated in said terpolymer prior to contact with said N-halothio-sulfonamide, or
(b) incorporated in said N-halothio-sulfonamide prior to contact with said terpolymer, or
(c) introduced into a mixture of said terpolymer and said N-halothio-sulfonamide, or
(d) introduced by a combination of (a), (b) and/or (c).

15. The process of claim 2 wherein said modified terpolymer is substantially gel-free.

16. The process of claim 5 wherein said N-halothiosulfonamide is N-chlorothio-N-methyl-benzene-sulfonamide.

17. The process of claim 13 wherein said terpolymer is ethylene, propylene nonconjugated diene rubber wherein said nonconjugated diene is 1,4-hexadiene or dicyclopentadiene, said N-halothio-sulfonamide is N-chlorothio-N-methylbenzenesulfonamide and said catalyst metal is copper.

18. A melt process for modifying
(a) a terpolymer comprising ethylene, at least one additional, and at lest one non-conjugated diene monomer, wherein said alpha-olefin contains 3 to 16 carbon atoms and wherein said non-conjugated diene is present at greater than about 0.1 weight percent based on the total weight of the terpolymer, and wherein said non-conjugated diene, following incorporation in said terpolymer, does not include an olefinic carbon atoms which is fully substituted, with
(b) N-halothio-sulfonamide of the formula wherein the mole ratio of said N-halothio-sulfonamide to unsaturated sites in said terpolymer is in the range of about 0.03/1 to about 1/1, where $R^1$ and $R^2$ are selected from the group consisting of alkyl radicals having 1–209 carbon atoms, aralkyl radicals having 7–20 carbon atoms, aryl and haloaryl radicals having 6–10 carbon atoms and where $R^1$ is also selected from radicals having the formula wherein $R^3$ and $R^4$ are individually selected from said alkyl, aralkyl, aryl and haloaryl radicals and where $R^3$ and $R^4$ can be joined together to represent radicals selected from $(CH_2)_n$, where n is an integer of 4 to 7, and $-(CH_2)_2-O-(CH_2)_2-$ where X is selected from chlorine and bromine, which comprises bringing (a) and (b) into reactive contact, at a temperature ranging from about 40° C. to about 170° C., in the presence of a catalyst of the formula $MA_n$, wherein A is an anion or mixture of anions of a weak acid, M is a metal selected from the group consisting of iron and zinc, n is a number corresponding to the oxidation state of M divided by the valence of said weak acid anion and M is present in said terpolymer at the time of reaction at a concentration of less than about 75 parts per million where iron is used and less than about 50 parts per million where zinc is used.

19. The process of claim 18 wherein said terpolymer comprises about 10 to about 80 weight percent alpha-olefin and about 0.1 to about 15 weight percent non-conjugated diene in polymerized form selected from the group consisting of 1,4-hexadiene and dicyclopentadiene.

20. The process of claim 19 wherein X is chlorine.

21. The process of claim 20 wherein said weak acid anion is derived from the group consisting of $C_4$ to $C_{20}$ mono- or poly-carboxylic acids.

22. The process of claim 21 wherein said carboxylic acid anion is derived from the group consisting of caproic, caprylic, lauric, stearic, 2-ethyl hexanoic, neodecanoic and naphthenic.

23. The process of claim 18 wherein said melt reaction is accomplished by means selected from the group consisting of kneaders, mills, continuous flow means and internal mixers.

24. The process of claim 23 wherein said continuous flow means comprises means for conveying said terpolymer therethrough, means for delivering said N-halothio-sulfonamide and said catalyst, and polymer deforming and surface disrupting means.

25. The process of claim 24 wherein said continuous flow means is an extruder.

26. The process of claim 24 wherein said catalyst is:
(a) incorporated in said terpolymer prior to contact with said N-halothio-sulfonamide, or
(b) incorporated in said N-halothio-sulfonamide prior to contact with said terpolymer, or
(c) introduced into a mixture of said terpolymer and said N-halothio-sulfonamide, or
(d) introduced by a combination of (a), (b) and/or (c).

27. The process of claim 19 wherein said modified terpolymer is substantially gel-free.

28. A solution process for modifying
(a) a terpolymer comprising ethylene, at least one additional, and at least one non-conjugated diene monomer, wherein said alpha-olefin contains 3 to 16 carbon atoms and wherein said non-conjugated diene is present at greater than about 0.1 weight percent based on the total weight of the terpolymer, and wherein said non-conjugated diene, following incorporation in said terpolymer, does not include an olefinic carbon atoms which is fully substituted, with
(b) N-halothio-sulfonamide of the formula wherein the mole ratio of said N-halothio-sulfonamide to unsaturated sites in said terpolymer is in the range of about 0.03/1 to about 1/1, wherein $R^1$ and $R^2$ are selected from the group consisting of alkyl radicals having 1–20 carbon atoms, aralkyl radicals having 7–20 carbon atoms, aryl and haloaryl radicals having 6–10 carbon atoms and where $R^1$ is also selected from radicals having the formula where $R^3$ and $R^4$ are individually selected from said alkyl, aralkyl, aryl and haloaryl radicals and where $R^3$ and $R^4$ can be joined together to represent radicals selected from $(CH_2)_n$, where n is an integer of 4 to 7, and $-(CH_2)_2-O-(CH_2)_2-$, where X is selected from chlorine and bromine, which comprises bringing (a) and (b) into reactive contact in the presence of a catalyst of the formula $MA_n$, wherein A is an anion or mixture of anions of a weak acid, M is a metal selected from the group consisting of iron and zinc, n is a number corresponding to the oxidation state of M divided by the valence of said weak acid anion and reaction time is less than about one hour at about 100° C.

29. The process of claim 28 wherein said terpolymer comprises about 10 to 80 weight percent alpha-olefin and about 0.1 to about 15 weight percent non-conjugated diene in polymerized form selected from the group consisting of 1,4-hexadiene and dicyclopentadiene.

30. The process of claim 29 wherein X is chlorine.

31. The process of claim 30 wherein said weak acid anion is derived from the group consisting of $C_4$ to $C_{20}$ mono- or poly-carboxylic acids.

32. The process of claim 31 wherein said carboxylic acid anion is derived from the group consisting of caproic, caprylic, lauric, stearic, 2-ethyl hexanoic, neodecanoic and naphthenic.

33. The process of claim 28 wherein said solution comprises an inert organic solvent selected from the group consisting of heptane, hexane, cyclohexane, methylcyclohexane, chloroform, benzene, toluene and mixtures thereof.

34. The process of claim 28 wherein said catalyst is:
(a) incorporated in said terpolymer prior to contact with said N-halothio-sulfonamide, or
(b) incorporated in said N-halothio-sulfonamide prior to contact with said terpolymer, or
(c) introduced into a mixture of said terpolymer and said N-halothio-sulfonamide, or
(d) introduced by a combination of (a), (b) and/or (c).

35. The process of claim 29 wherein said modified terpolymer is substantially gel-free.

* * * * *